(12) United States Patent
Ueki

(10) Patent No.: US 6,615,868 B2
(45) Date of Patent: Sep. 9, 2003

(54) SPOOL VALVE

(75) Inventor: Akihiro Ueki, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/975,310

(22) Filed: Oct. 12, 2001

(65) Prior Publication Data

US 2002/0079002 A1 Jun. 27, 2002

(30) Foreign Application Priority Data

Oct. 13, 2000 (JP) ........................................ 2000-312988
Oct. 23, 2000 (JP) ........................................ 2000-322831

(51) Int. Cl.⁷ ............................................. F16K 47/04
(52) U.S. Cl. ............................ 137/625.3; 137/625.34; 137/625.69
(58) Field of Search ...................... 137/625.3, 625.34, 137/625.69, 596.13

(56) References Cited

U.S. PATENT DOCUMENTS 3,009,480 A * 11/1961 Miller
4,122,868 A * 10/1978 Holloway et al. ..... 137/625.69
4,155,535 A * 5/1979 Seamone .................... 251/282
4,220,178 A * 9/1980 Jackson ................... 137/625.3
4,862,920 A * 9/1989 Cleasby ................... 137/625.3
4,941,508 A * 7/1990 Hennessy et al. ...... 137/625.69

FOREIGN PATENT DOCUMENTS

JP 2568961 1/1998
JP 2580463 6/1998

OTHER PUBLICATIONS

Partial English Translation of JP Publication No. 51,155329.
Partial English Translation of JP Publication No. 60–85668.
English Abstract of JP Publication No. 57–107471.
English Abstract of JP Publication No. 08–061521.
English Abstract of JP Publication No. 09–269084.

* cited by examiner

*Primary Examiner*—John Fox
(74) *Attorney, Agent, or Firm*—Arent Fox Kintner Plotkin & Kahn, PLLC

(57) ABSTRACT

A spool valve includes a groove defined in the spool and a notch. A line A is drawn to extend through a communication zone a provided upon communication of the notch which is disposed at a distal end of the line A and defined in a step of a spool with an input port to form a 69° angle with respect to an L-axis. Fluid flowing into the groove through the communication zone a upon communication of the notch with the input port, does not collide with other portions of the spool before colliding with a bottom of the groove. Therefore, the flow of the fluid along the L-axis causes a flow force applied to the spool to be suppressed resulting in a decreased load on an actuator. The notch makes it is possible to ensure the stable operation of a spool valve, while preventing the self-induced vibration of the spool.

7 Claims, 10 Drawing Sheets

SPOOL VALVE

BACKGROUND OF THE INVENTION

1. Field of the Invention

The present invention relates to a spool valve having notches provided in a step between a land and a groove in a spool.

2. Description of the Related Art

Such a spool valve is known from Japanese Utility Model Registration Nos. 2568961 and 2580463.

FIGS. 9 and 10 show the structure of a conventional pressure-controlling spool valve having a proximal end toward a direct drive-type linear solenoid 26 and a distal end away from the solenoid. An input port 13, an output port 14, a drain port 15 and a feedback port 16 are open along an axis, L, into a valve bore 12 which is circular in cross section and defined in a valve housing 11. A spool 17 is slidably received in the valve bore 12 in the valve housing 11 and includes a first land 18, a second land 19, a third land 20, a spring seat 21 extending from a distal end of the third land 20, a first groove 22 defined between the first land 18 and the second land 19, a second groove 23 defined between the first land 18 and the third land 20, and a solenoid connection 24 extending from a proximal end of the second land 19. The spool 17 is biased proximally by a valve spring 25 disposed between an end of the valve bore 12 and the spring seat 21 to coaxially abut against a distal end of an output rod 27 of the direct drive-type linear solenoid 26 for directly operating the spool 17.

The first groove 22 in the spool 17 is connected to a proximal end of the first land 18 through a first step 28. The first step 28 is perpendicular to the L-axis and axially disposed from the second land 19 through a second step 29 perpendicular to the L-axis. A predetermined number of (e.g., four) notches 30 are defined in the first step 28 by chamfers inclined at 30° with respect to the L-axis. When the spool 17 is in a position as shown in FIG. 9, the input port 13 is in communication with the output port 14 through the first groove 22. When the spool 17 is moved proximally, to cut off the communication between the input port 13 and the first groove 22, the output port 14 is brought into communication with the drain port 15 through the first groove 22. A feedback pressure is applied to an oil chamber 31 provided distally of the third land 20 through the feedback port 16. An oil chamber 32 defined between the first land 18 and the third land 20 communicates with the spool 17 through an oil bore 33 defined to connect the first groove 22 and the second groove 23 to each other.

In the spool valve having the above-described arrangement, when the linear solenoid 26 is excited to drive the output rod 27 distally, thereby urging the proximal end of the spool 17 against a repulsive force of the valve spring 25, the input port 13 is put into communication with the output port 14 through the first groove 22, such that the hydraulic pressure in the input port 13 is reduced depending on the opening degree thereof and delivered from the output port 14. In this case, the amount of pressure changed in the output port 14 relative to the amount of change in position of the spool 17 can be decreased to inhibit a self-induced vibration of the spool 17.

In the above prior art, the oil supplied from the input port 13 is passed through the notches 30 into the first groove 22. The oil flows within the first groove 22 in the direction of the L-axis to collide with the second step 29, thereby producing a flow force Fo for biasing the spool 17 proximally. The flow force Fo acts to oppose a distal drive force Fs generated by the linear solenoid 26, causing the smooth operation of the linear solenoid 26 is obstructed. As a result, it is difficult to conduct a subtle hydraulic pressure control.

SUMMARY OF THE INVENTION

Accordingly, an object of the present invention is to ensure that the notches are defined in the spool to suppress the generation of a flow force, thereby stabilizing the operation of the spool valve, while preventing the generation of vibration.

To achieve the above object, according to a first aspect and feature of the present invention, there is provided a spool valve comprising a valve housing having a valve bore, an input port and an output port axially spaced within the valve housing and opening into the valve bore. A spool is received in the valve bore for sliding movement in the axial direction. A first land and a second land are formed on the spool and spaced along the axis. A groove is defined in the spool and connected to the first and second lands through first and second steps. A notch is formed by a cutout portion from the first step. Also, an actuator drives the spool in the axial direction, so that the spool is driven by the actuator to put the input port into communication with the groove. When the input port is put into communication with the groove, a fluid flowing into the groove through the input port is discharged from the output port through the groove. The notch in the spool is formed so that a line, which extends through a communication zone provided upon communication of the notch with the input port, and which forms a free flow-in angle with respect to the axial direction, first intersects a bottom of the groove.

With the above arrangement, when the notch is put into communication with the input port, the fluid flowing into the groove through the communication zone does not collide with other portions of the spool, before colliding with the bottom of the groove. Therefore, the flow of the fluid in the axial direction, which causes the flow force applied to the spool, is suppressed and the load on the actuator is decreased. Thus, it is possible to decrease the flow force applied to the spool to achieve the stable operation of the spool valve, while preventing the self-induced vibration of the spool as a result of the notch cut out from the first step.

According to a second aspect and feature of the present invention, the free flow-in angle is 69°, which corresponds to a maximum free flow-in angle. Hence, even if the free flow-in angle becomes equal to 69°, corresponding to the maximum free flow-in angle in accordance with the shape of the notch and the opening degree of the input port, the flow force applied to the spool can be suppressed so as to be small.

According to a third aspect and feature of the present invention, the notch is formed in a direction perpendicular to the axis. The notch can be made by an end mill, resulting in enhanced workability.

According to a fourth aspect and feature of the present invention, there is provided a spool valve comprising a valve housing having a valve bore, an input port and an output port defined in the valve housing and spaced along an axis and opening into the valve bore. A spool is received in the valve bore for sliding movement in the axial direction. A first land and a second land are formed on the spool and spaced along the axis. A groove is defined in the spool and connected to the first and second lands through first and second steps, respectively. A notch is formed as a cutout portion from the first step, and an actuator for driving the spool in the axial direction, puts the input port into communication with the groove, so that a fluid flowing into the groove through the input port is discharged from the output port through the groove. A concave curved face is formed on a bottom of the groove. The notch in the spool is formed so that a line, which extends through a communication zone provided upon communication of the notch with the input port and which forms a free flow-in angle of a jet formed by the notch, points to a portion of the curved face displaced from a smallest-diameter portion toward the first step.

With the above arrangement, a fluid flowing into the groove upon communication of the notch in the spool with the input port, before colliding with the bottom of the groove, does not collide with other portions of the spool. Therefore, the momentum of the fluid causing a flow force applied to the spool can be suppressed to decrease the load on the actuator. Particularly, a portion, against which the fluid flowing into the groove through the communication zone first collides, is that portion of the concave curved face formed in the groove, which is displaced from the smallest-diameter portion toward the first step. Therefore, the fluid is guided to the curved face, where the fluid is then turned smoothly and radially outwards. Hence, the flow force can be effectively be further decreased. Thus, the flow force applied to the spool can be decreased to ensure the stable operation of the spool valve, while preventing the self-induced vibration of the spool because of the notch in the first step.

According to a fifth aspect and feature of the present invention, the portion of the curved face displaced from the smallest-diameter portion toward the second step points toward the output port. Hence, the fluid can be guided smoothly to the output port, so that the flow force can be further decreased.

According to a sixth aspect and feature of the present invention, the free flow-in angle is 69°, which corresponds to a maximum free flow-in angle. Hence, even if the free flow-in angle becomes equal to 69° corresponding to the maximum free flow-in angle in accordance with the shape of the notch and the opening degree of the input port, the flow force applied to the spool can be suppressed so as to be small.

According to a seventh aspect and feature of the present invention, the notch is formed in a direction perpendicular to the axis. Hence, the notch can be made by an end mill, resulting in enhanced workability.

According to an eighth aspect and feature of the present invention, the notch comprises a face extending contiguously from the communication zone to the curved face. Hence, the fluid flowing into the groove through the communication zone can be guided to the output port with the momentum thereof suppressed to the minimum, so that the flow force applied to the spool can be further decreased.

A linear solenoid 26 in each of embodiments corresponds to the actuator of the present invention, and a first groove 22 in each of the embodiments corresponds to the groove of the present invention.

The above and other objects, features and advantages of the invention will become apparent from the following description of the preferred embodiment taken in conjunction with the accompanying drawings.

BRIEF DESCRIPTION OF THE DRAWINGS

FIGS. 1 to 3 show a first embodiment of the present invention, wherein

FIG. 1 is a vertical sectional view of a spool valve;

FIG. 2 is a perspective view of a spool;

FIG. 3 is a view for explaining a flow-in angle;

FIGS. 4 and 5 show a second embodiment of the present invention, wherein

FIG. 4 is a vertical sectional view of a spool valve;

FIG. 5 is a perspective view of a spool;

FIGS. 7 and 8 show effects of the embodiments, wherein

FIG. 7 is a graph showing variations in pressure loss with respect to the flow rate of a fluid;

FIG. 8 is a graph showing the risings in clutch hydraulic pressure with respect to the time lapsed from the start of supplying of electric current to a linear solenoid;

FIGS. 9 to 11B show the prior art, wherein

FIG. 9 is a vertical sectional view of a spool valve;

FIG. 10 is a perspective view of a spool; and

FIGS. 11A and 11B are views each showing the shape of a notch in the conventional spool valve.

DESCRIPTION OF THE PREFERRED EMBODIMENTS

A first embodiment of the present invention will now be described with reference to FIGS. 1 to 3.

Figure 1:
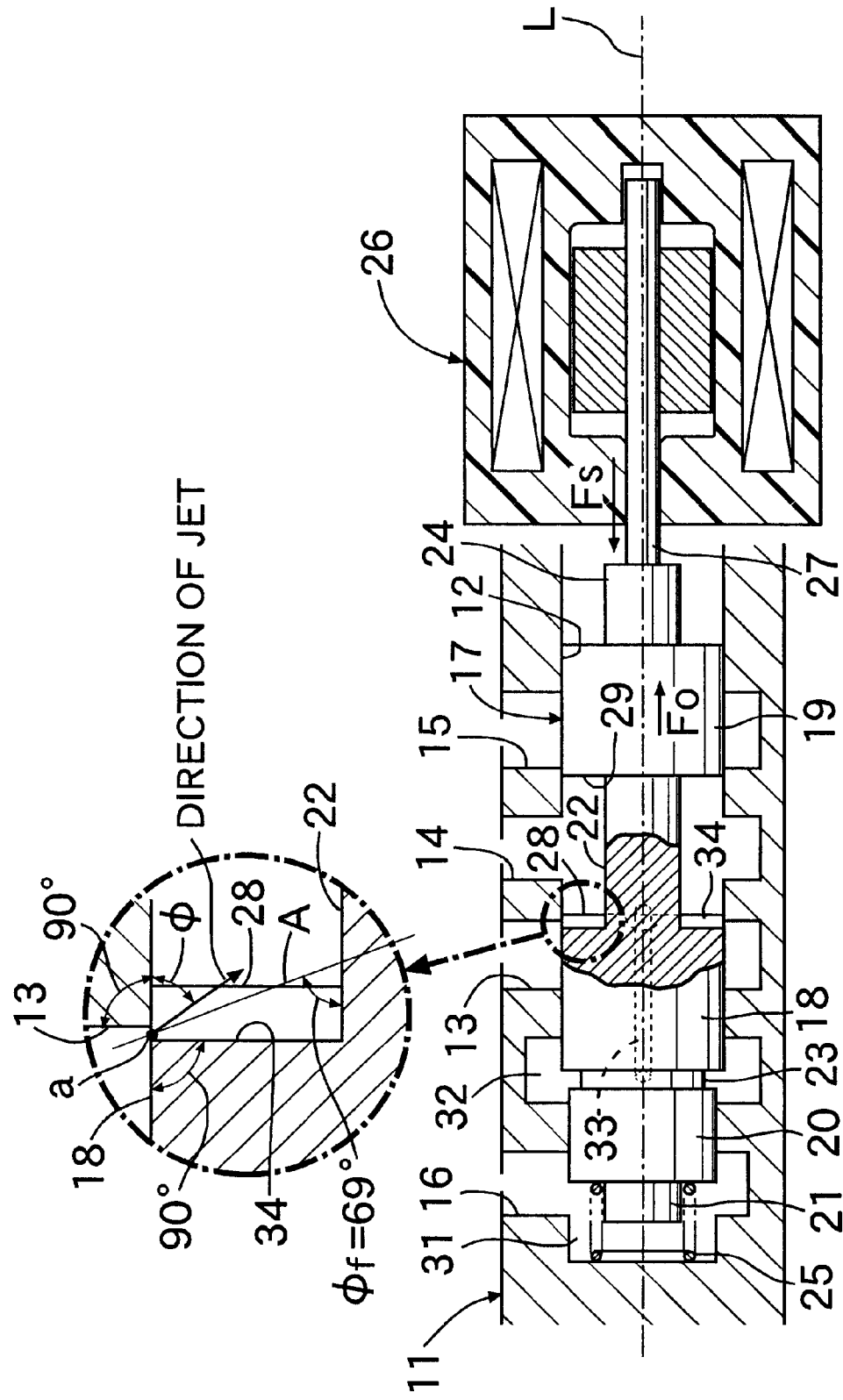
Figure 2:
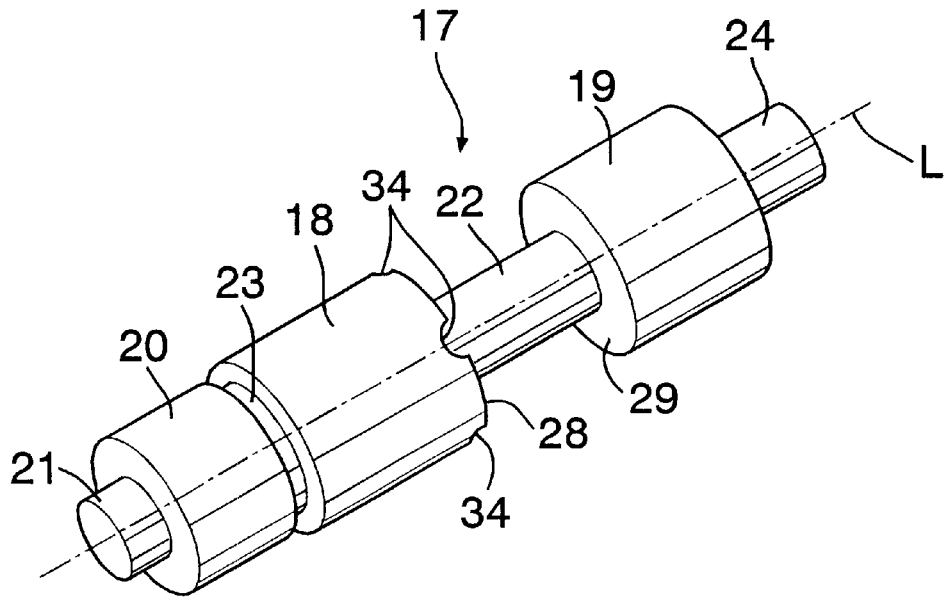
Figure 3:
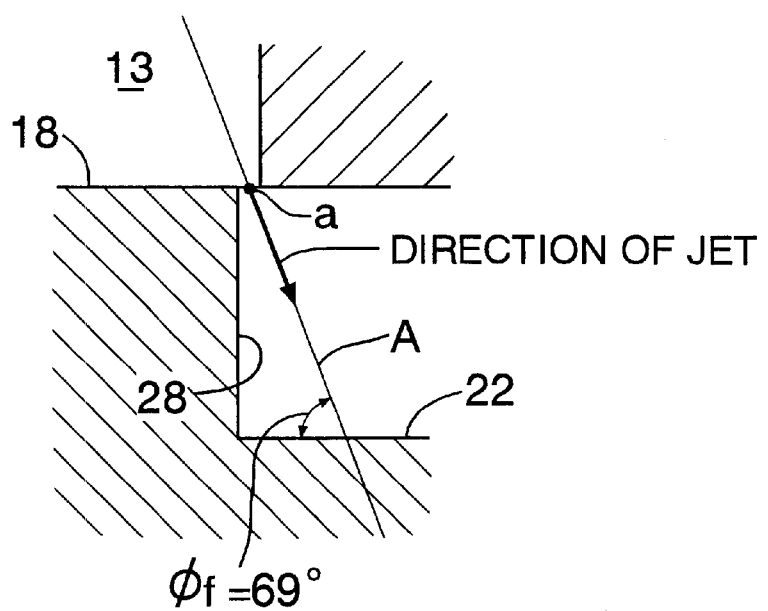
Figure 9:
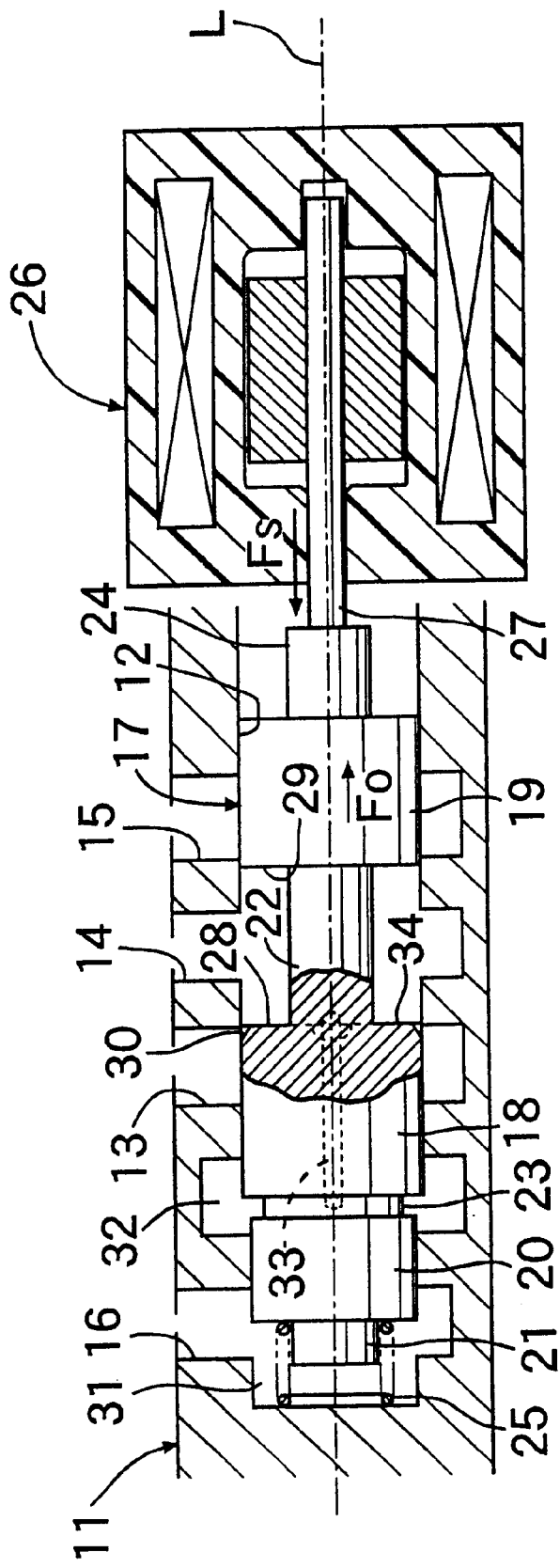
Figure 10:
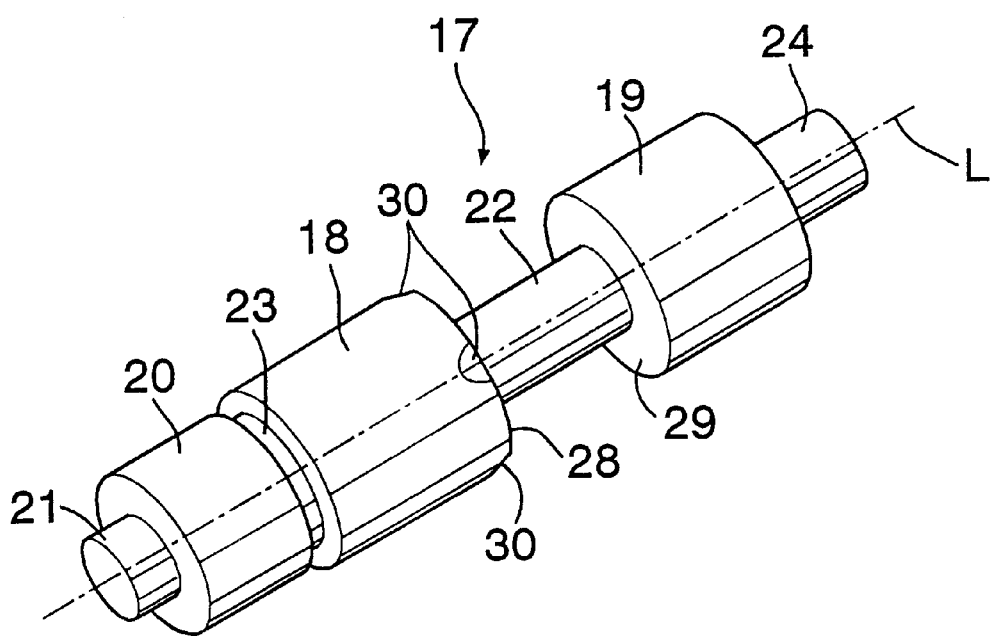

Referring to FIGS. 1 and 2, a spool valve according to a first embodiment of the present invention is of a similar structure as the conventional spool valve described with reference to FIGS. 9 and 10, except that the shape of a notch 34 is different from that of the notch in the conventional spool valve. Therefore, the duplicated description is omitted by designating components or portions corresponding to those in the first embodiment by like reference characters, and thus, the point of difference between the first embodiment and the conventional spool valve, i.e., the structure of the notch 34 will be mainly described.

A predetermined number of (e.g., four) notches 34 formed in a first step 28 connecting a first land 18 and a first groove 22 of a spool 17 to each other are each comprised of a partially columnar cutout portion extending in a direction perpendicular to an axis, L. The notches are connected at their opposite ends to an outer peripheral surface of the first land 18 and an outer peripheral surface of the first groove 22. In this way, the notches 34 are formed in a direction perpendicular to the L-axis and can be made by an end mill, resulting in enhanced workability.

An angle at which oil flows into the first groove 22 upon opening of an input port 13 is called a flow-in angle $\phi$. The flow-in angle $\phi$ provided when the oil flows in parallel to the L-axis is 0°, and the flow-in angle $\phi$ provided when the oil flows perpendicularly to the L-axis is 90°. As shown in FIG. 3, the flow-in angle $\phi$ provided when a first step 28 has no notch and an input port 13, are formed at an angle of 90° with respect to the L-axis is called a free flow-in angle $\phi f$. The free flow-in angle $\phi f$ is increased up to a maximum value ($\phi f = 69°$) with an increase in opening degree of the input port 13. In general, the flow-in angle $\phi$ provided when the notches 34 are formed in the first step 28 is smaller than the free flow-in angle $\phi f$ provided when there are no notches provided. Therefore, the flow-in angle $\phi$ provided when the notches 34 are formed in the first step 28 cannot exceed 69°. The flow-in angle $\phi$ is disclosed in "Hydraulic Pressure Control" written by Toshio Takenaka and Eizo Kamata (issued from Maruzen, Colo.).

Returning to FIG. 1, when a line A is drawn extending through a communicating zone a provided upon communication between the input port 13 and the first groove 22 toward the L-axis at an angle of 69° (which is the maximum value of the free flow-in angle) with respect to the L-axis, the shape of the notch 34 is determined so that the line A first intersects a bottom of the first groove 22, but does not intersect other portions of the spool 17. If the notches 34 are located opposite the flow-in angle φ in the above manner, the flow-in angle φ provided upon opening of the input port 13 is, at the most, smaller than 69°. The oil flowing into the first groove 22 through the input port 13 in the form of a jet can reach the bottom of the first groove 22 without being obstructed by the notches 34. The jet reaching the bottom of the first groove 22 has a reduced flow speed, and therefore, even if the jet is deflected along the L-axis to flow along the bottom of the first groove 22 and collide with a second step 29, a generated flow force Fo is suppressed, ensuring the smooth operation of a linear solenoid 26.

Figure 11A:
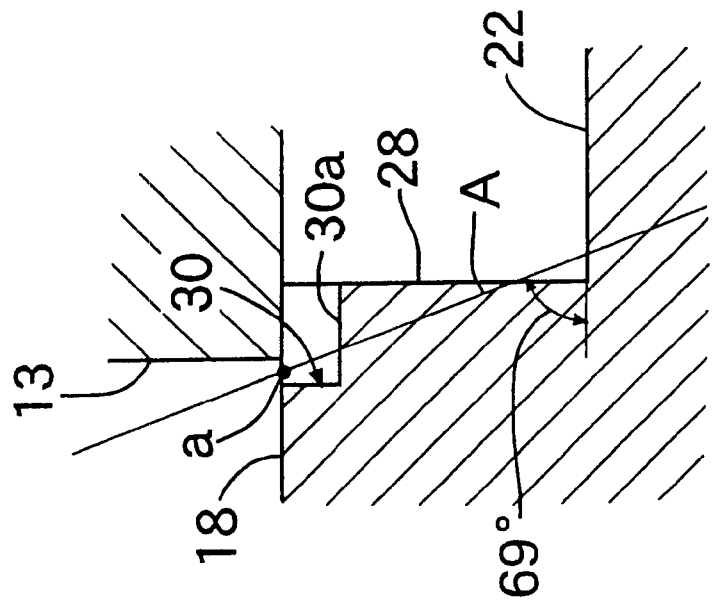
Figure 11B:
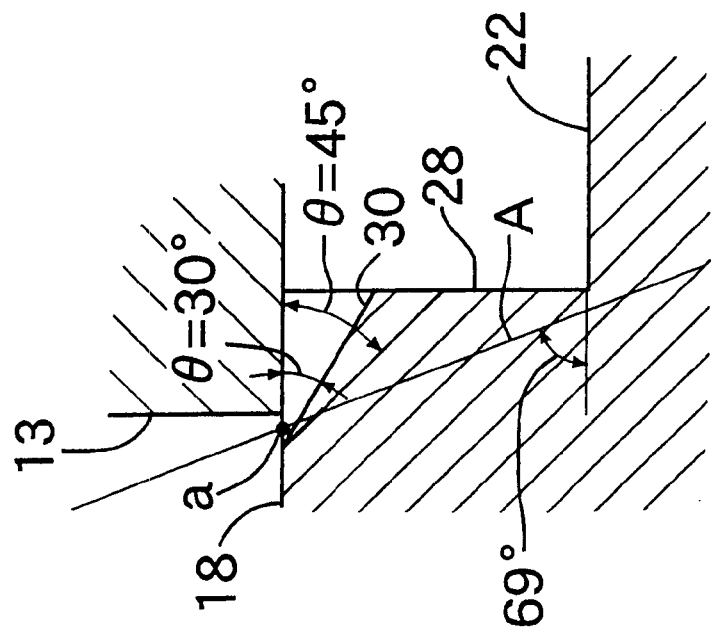

In contrast, in the prior art shown in FIG. 11A, the angle of each of the notches 30 is 30° or 45° and the notches protrude toward a proximal side of the line A. For this reason, the jet flowing into the first groove 22 upon opening of the input port 13 is guided to the notches 30 and forcibly deflected proximally along the L-axis and forcefully collides with the second step 29 to produce a large flow force Fo. In the prior art shown in FIG. 11B, the angle of the tip end of the notch 30 is a right angle and the notch 30 is located toward a distal end of the line A, but the step 30a of the notch 30 extending in the direction of the L-axis extends in the direction of the proximal side of the line A. For this reason, the jet flowing into the first groove 22 upon opening of the input port 13 is guided to the step 30a of the notch 30 and forcibly deflected proximally along the L-axis. At this time, the vigorousness of the jet deflected proximally is also increased to produce a large flow force Fo, because the distance between the step 30a of the notch 30 and the input port 13 is small.

Figure 4:
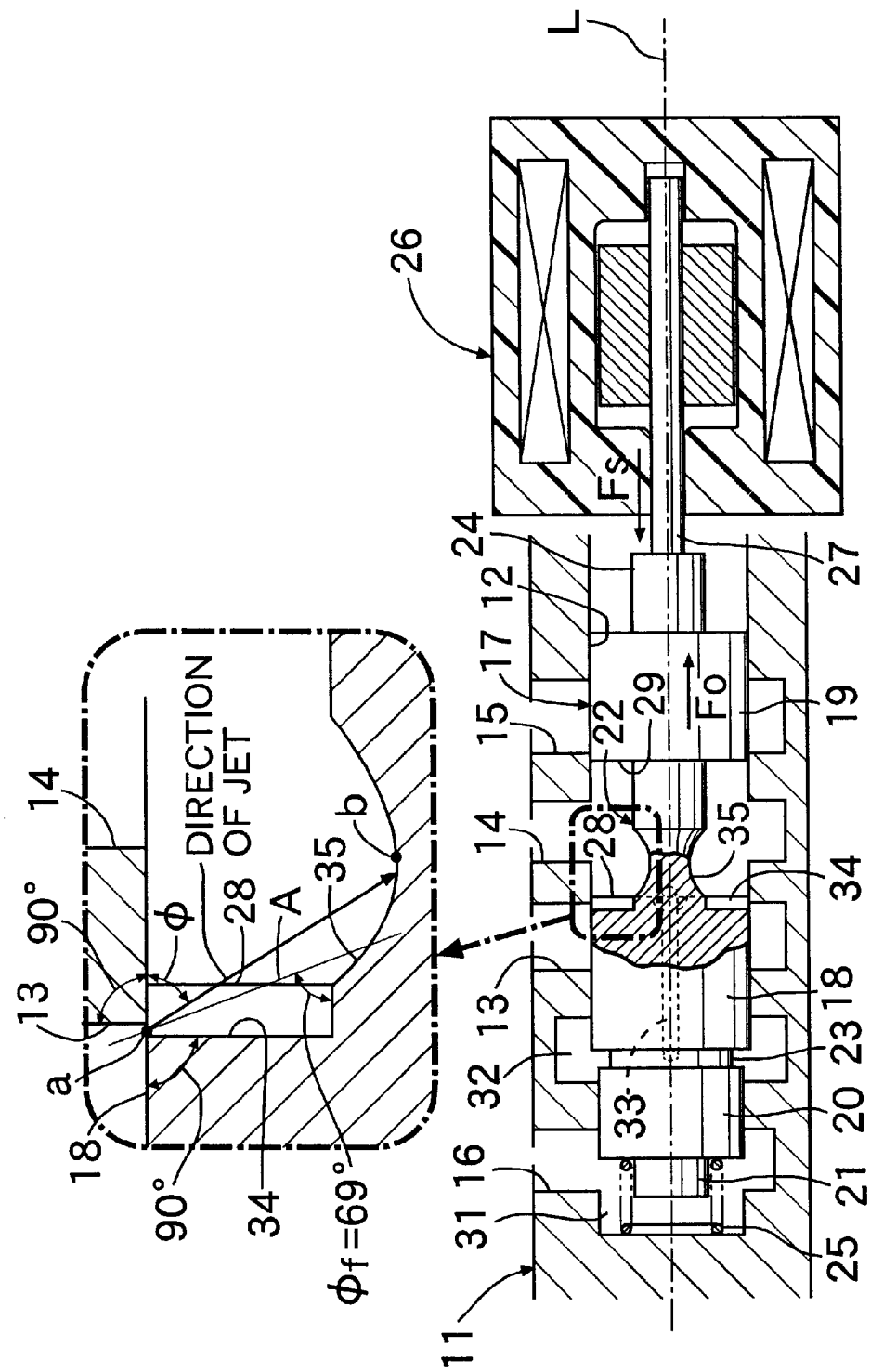
Figure 5:
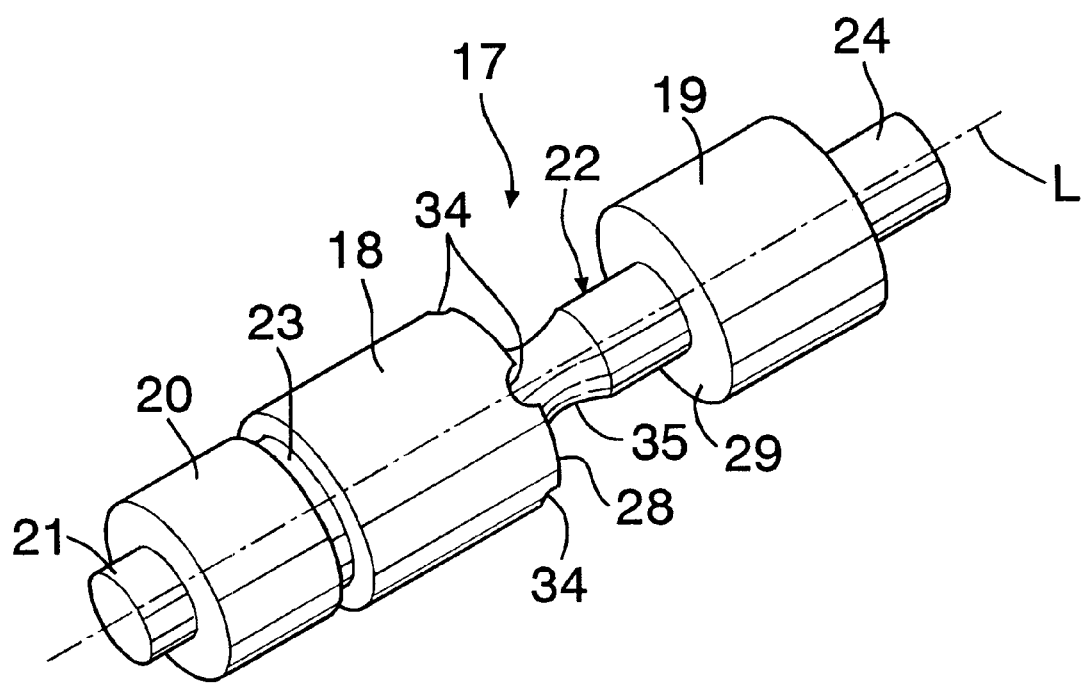

A second embodiment of the present invention will be described below with reference to FIGS. 4 and 5.

A spool valve according to the second embodiment is of a structure similar to that in the first embodiment, except for a difference in that a concave curved face 35 is formed in a first groove 22 of a spool 17 of the spool valve. Therefore, a point of difference, i.e., the shape of the curved face 35 will be mainly described below.

In the concave curved face 35 formed on a bottom of the first groove 22, a smallest-diameter portion b is located at an intermediate portion along the L-axis. A curved face portion extending distally along the L-axis from the smallest-diameter portion b terminates at a location corresponding to a first step 28. A curved face portion extending proximally along the L-axis from the smallest-diameter portion b terminates at a location short of a second step 29.

When a line A is drawn extending through a communicating zone a provided upon communication of the input port 13 with the first groove 22 toward the L-axis at an angle of 69° (which is the maximum value of the free flow-in angle φf) with respect to the axis L, the shape of the notch 34 is determined, so that the line A first intersects a portion (displaced from the first step 28 toward the smallest-diameter portion b) of the curved face 35 formed on the bottom of the first groove 22, but does not intersect other portions of the spool 17. If notches 34 are located on a distal end of the line A in the above manner, the flow-in angle φ provided upon the opening of the input port 13 is, at most, smaller than 69°, the oil flowing into the first groove 22 through the input port 13 in the form of a jet can reach the bottom of the first groove 22 without being obstructed by the notches 34. The jet reaching the bottom of the first groove 22 has a reduced flow speed and therefore, even if the jet is deflected along the L-axis to flow along the bottom of the first groove 22, and collide with the second step 29, a generated flow force Fo is suppressed to a small level, ensuring the smooth operation of a linear solenoid 26.

Moreover, the line A points the portion of the curved face 35 of the first groove 22 displaced from the smallest-diameter portion b toward the first step 28. As such, the jet first collides against the portion of the curved face 35 of the first groove 22 displaced from the smallest-diameter portion b toward the first step 28, and is guided radially inwards then gradually turned radially outwards. Thereafter, the jet is guided smoothly toward an output port 14 by a portion of the curved face 35 of the first groove 22 displaced from the smallest-diameter portion b toward the second step 29.

Figure 6:
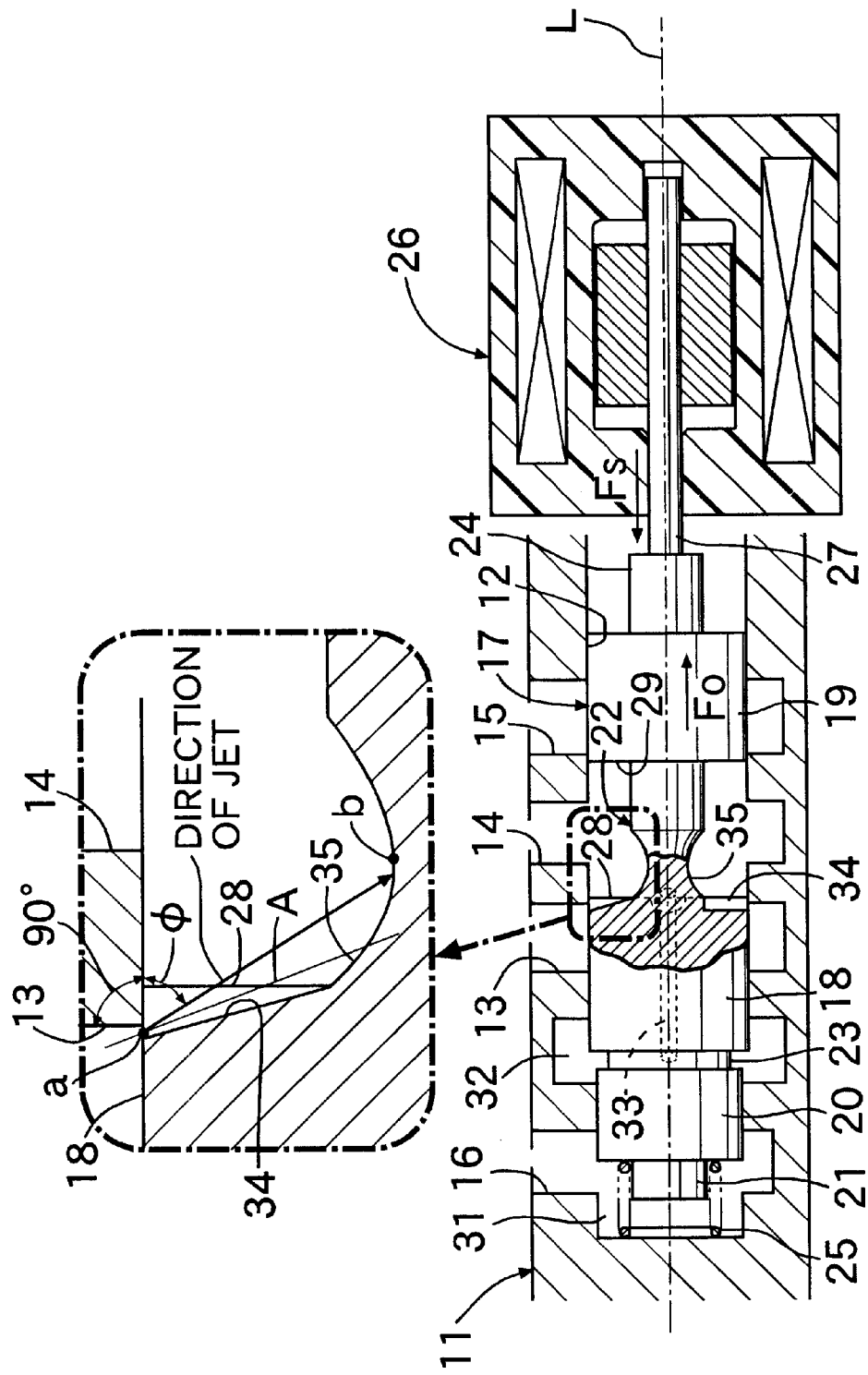
FIG. 6 is a vertical sectional view of a spool valve according to a third embodiment of the present invention.

A third embodiment of the present invention will be described below with reference to FIG. 6.

The third embodiment is different from the second embodiment in respect of the shape of a notch 34. The notch 34 in the second embodiment is formed in the direction perpendicular to the L-axis and, in contrast, the notch 34 in the third embodiment is formed obliquely with respect to the L-axis. The notch 34 extends from a communication zone a between the input port 13 and the first groove 22, and is linearly connected to a distal end of the curved face 35 without a step. The other construction is similar to that in the second embodiment.

According to the present embodiment, a fluid flowing into the groove 22 through the communication zone a is guided smoothly along the notch 34 to the curved face 35. Therefore, the fluid can be guided to the output port 14 with a reduction in momentum of the fluid suppressed to be a minimum, thereby further reducing the flow force Fo applied to the spool 17.

The effect of the present invention will be described with reference to FIGS. 7 and 8.

Figure 7:
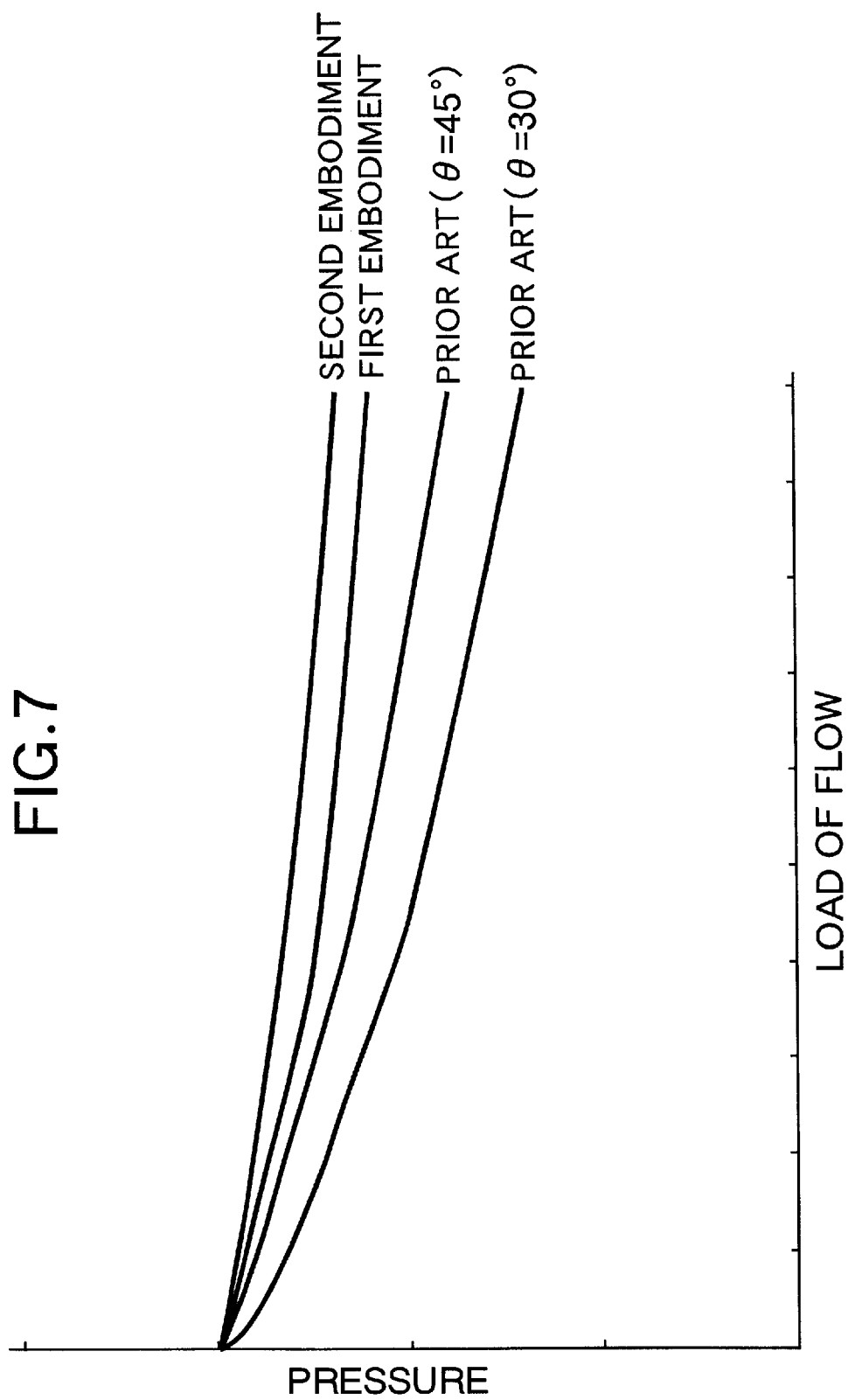

A graph in FIG. 7 shows the relationship between the flow rate of the oil flowing into the first groove 22 through the input port 13 and the oil pressure in the output port 14 in each of the first and second embodiments and the prior art (shown in FIG. 11A in which θ=30° and θ=45°). The pressure loss is largest in the prior art in which θ=30° and smallest in the prior art in which θ=45° and also in the first and second embodiments. Specifically, the pressure loss is smallest in the second embodiment.

Figure 8:
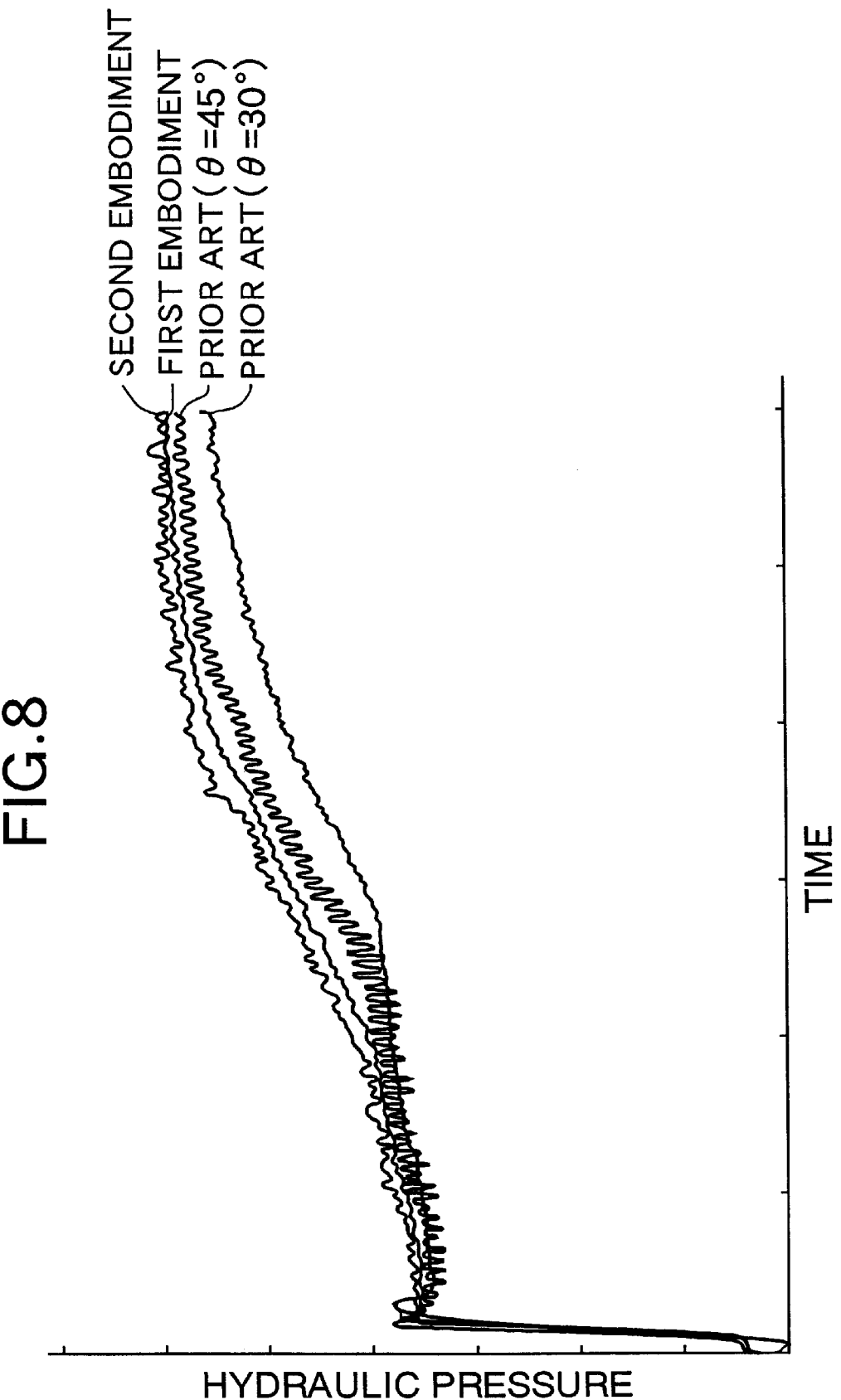

A graph in FIG. 8 shows the relationship between the rising of the clutch hydraulic pressure and the time lapsed from the start of supplying of electric current to the linear solenoid 26 in each of the first and second embodiments and the prior art (shown in FIG. 11A and in which θ=30° and θ=45°). The rising of the clutch hydraulic pressure is earliest in the second embodiment and then latest in the order of the first embodiment and the prior art in which θ=45° and the prior art in which θ=30°, specifically the rising of the clutch hydraulic pressure is latest in the prior art in which θ=30°.

As described above, according to the first and second embodiments of the present invention, the flow force Fo can be effectively reduced and therefore, it is possible to prevent an extra load from being applied to the linear solenoid 26 and alleviate the pressure loss and overcome a reduction in responsiveness of the pressure control. In particular, the present invention is advantageous when a direct drive-type linear solenoid 26 is employed as an actuator and previous difficulties in generating large drive force Fs due to a small size of a coil can be eliminated.

According to the third embodiment, a further enhancement in performance more than that in the second embodiment is expected in view of a further reduction in flow force Fo.

The shape of the notch 34 is not limited to that disclosed in the embodiments and may be changed as desired. The spool valve according to the present invention is applicable to any valve other than the hydraulic pressure control valve. If the communication zone a and the distal end of the curved face 35 are connected smoothly by a curved line in place of the straight line in the third embodiment, further effectiveness can be achieved.

Although the embodiments of the present invention have been described in detail, it will be understood that the present invention is not limited to the above-described embodiments, and various modifications in design may be made without departing from the spirit and scope of the invention defined in claims.

What is claimed is:

1. A spool valve comprising:

a valve housing having a valve bore;

an input port and an output port axially disposed from each other and defined in said valve housing and opening into said valve bore;

a spool received in said valve bore for sliding movement in an axial direction;

a first land and a second land formed on said spool and axially disposed from each other;

a groove defined in said spool and connected to said first and second lands through first and second steps;

a notch cutout portion from said first step; and an actuator that drives said spool in the axial direction, so that said input port is put into communication with said groove;

wherein a fluid flowing into said groove through said input port is discharged from said output port through said groove, and a concave curved face is formed on a bottom of said groove;

and wherein said notch in said spool is formed so that a line which extends through a communication zone provided upon communication of said notch with said input port and which forms a free flow-in angle of a jet formed by said notch, points to a portion of said curved face displaced from a smallest-diameter portion toward said first step.

2. A spool valve according to claim 1, wherein the portion of said curved face displaced from said smallest-diameter portion toward said second step points to said output port.

3. A spool valve according to claim 2, wherein said portion of the curved face displaced from the smallest-diameter portion toward said second step terminates at a location short of said second step.

4. A spool valve according to claim 1, wherein said free flow-in angle is 69°.

5. A spool valve according to claim 1, wherein said notch is formed in a direction perpendicular to the axis.

6. A spool valve according to claim 5, wherein said notch is comprised of a partially columnar cutout portion extending in a direction perpendicular to said axial direction.

7. A spool valve according to claim 1, wherein said notch comprises a face extending contiguously from said communication zone to said curved face.

\* \* \* \* \*